(12) United States Patent
Hong (10) Patent No.: US 12,431,837 B1
(45) Date of Patent: Sep. 30, 2025

(54) DEPLOYABLE SOLAR PANEL SYSTEM FOR VEHICLES

(71) Applicant: Jinwon Hong, Seattle, WA (US)

(72) Inventor: Jinwon Hong, Seattle, WA (US)

( * ) Notice: Subject to any disclaimer, the term of this patent is extended or adjusted under 35 U.S.C. 154(b) by 0 days.

(21) Appl. No.: 19/092,350

(22) Filed: Mar. 27, 2025

Related U.S. Application Data (60) Provisional application No. 63/571,764, filed on Mar. 29, 2024.

(51) Int. Cl.
  *H02S 30/20* (2014.01)
  *H02S 20/30* (2014.01)

(52) U.S. Cl.
  CPC .............. *H02S 30/20* (2014.12); *H02S 20/30* (2014.12)

(58) Field of Classification Search
  CPC .................................. H02S 10/40; H02S 30/20
  See application file for complete search history.

(56) References Cited

U.S. PATENT DOCUMENTS

| | | |
|---|---|---|
| 10,080,252 B2 | 9/2018 | Sonnleitner |
| 11,563,504 B2 | 1/2023 | Galuten |

FOREIGN PATENT DOCUMENTS

CN  204906298 U  * 12/2015

OTHER PUBLICATIONS

English machine translation of Shen (CN-204906298-U) provided by the EPO website, All Pages, 2025. (Year: 2025).*
International Search Report and Written Opinion received in counterpart PCT Application No. PCT/US25/22121, dated May 16, 2025, consisting of 6 pages.

* cited by examiner

*Primary Examiner* — Daniel P Malley, Jr.
(74) *Attorney, Agent, or Firm* — Bold IP, PLLC; Houda El-Jarrah (57) ABSTRACT

The present invention relates to a deployable solar panel system for trucks. In order to achieve this, the present invention includes a guide bracket installed at the rear of the cap of the truck, multiple solar modules that fold or unfold to overlap or spread out inside the guide bracket, a pair of tension ropes (whereby either rope includes or is made of electric wire) installed beneath the guide bracket and connected to the solar modules, winding or unwinding the tension ropes to fold the solar modules inside the guide bracket or deploying them from outside the guide bracket using a winch, and a lift device that raises the guide bracket.

15 Claims, 9 Drawing Sheets

DEPLOYABLE SOLAR PANEL SYSTEM FOR VEHICLES

CROSS-REFERENCE TO RELATED APPLICATIONS

This non-provisional patent application claims priority to the provisional patent application No. 63/571,764 was filed on Mar. 29, 2024, which is incorporated by reference in its entirety.

FIELD OF THE DISCLOSURE

The disclosure relates generally to a deployable solar panel system for trucks, more specifically, to a deployable solar panel system for trucks, in which multiple solar panel modules are installed and are deployable as needed for use on the container box loaded on the truck vehicle.

BACKGROUND

Recently, fossil fuels have been limited in quantity and are expected to eventually deplete. Moreover, they emit various pollutants. Therefore, in most countries, there is a situation where alternative energy sources are being developed to replace fossil fuels. Among these alternative energies, solar power generation utilizing solar energy is a technology that directly converts infinite and pollution-free sunlight into electricity. It has the advantage of being able to generate electricity wherever sunlight reaches, without the pollution such as atmospheric pollution, noise, heat, and vibration associated with other methods. Devices for solar power generation have been stationary and installed in specific locations such as hillsides, offshore sites, and building rooftops. There is a need for a retractable and deployable solar panel system that may be installed on an upper surface of a truck and that does not require individual disconnection and connection or installation of the solar panels on the upper surface of a truck.

SUMMARY

The present description includes one or more non-limiting embodiments directed to a system comprising a deployable solar panel system for trucks.

The present description further comprises a system comprising a deployable solar panel system mounted on a rear surface of a driver cabin for a truck, the deployable solar panel system further comprising a lift device positioned beneath a guide bracket, wherein the guide bracket comprises a vertical surface connected to a horizontal surface. The system further comprises electrical equipment comprising an inverter or a transformer, at least one winch, one or more tension ropes rotatably connected to the pair of winches, wherein at least one of the one or more tension ropes comprises electrical wire that can conduct electric energy contained in a set of solar panels through the electrical equipment. The system may further comprise a guide bracket comprising a vertical surface connected to a horizontal surface in a perpendicular manner, the set of solar panel modules attached to the guide bracket via the one or more tension ropes, wherein the set of solar panel modules are configured to be in either a stowed, retracted position or an expanded position in order to extend over an upper surface of a shipping container on a truck, wherein the set of solar panel modules are configured to fully retract together as a whole unit and to be in the stowed, retracted position within an interior space of the guide bracket. The pair of tension ropes and/or electric wires are connected to the set of solar panel modules, wherein the lift device is configured to raise the guide bracket to an elevated position, wherein the set of solar panel modules are configured to expand and retract as a connected set. Each solar panel module of the set of solar panel modules may be attached on multiple sides of each solar panel module to the one or more tension ropes and electric wire.

Other aspects and advantages of the invention will be apparent from the following description and the appended claims.

BRIEF DESCRIPTION OF THE DRAWINGS

For a more complete understanding of this disclosure and its features, references are now made to the following description, taken in conjunction with the accompanying drawings in which.

DETAILED DESCRIPTION

The present invention is proposed to solve the aforementioned problems and provides a deployable solar panel system for a truck. In a non-limiting embodiment, it may be preferably used with a semi-truck but the system as described herein may be used with many variations of trucks, including but not limited to semi-trucks.

The deployable solar panel system comprises a driver's seat cabin and a container box placed in a loading compartment or loading space of a truck vehicle, wherein the solar panel modules of the solar panel system are effectively deployed on the top surface of the shipping container placed in the loading compartment in a simple, quick, and effective manner. The deployable solar panel modules are deployed over an upper surface of the shipping container of the truck. The deployable solar panel system may be installed on a lower loading space of the cabin of a truck in one or more non-limiting embodiments. Alternatively, the deployable solar panel system may be installed on an upper surface of the cabin of the truck in one or more non-limiting embodiment. Additional details are provided with respect to the Figures.

Figure 1:
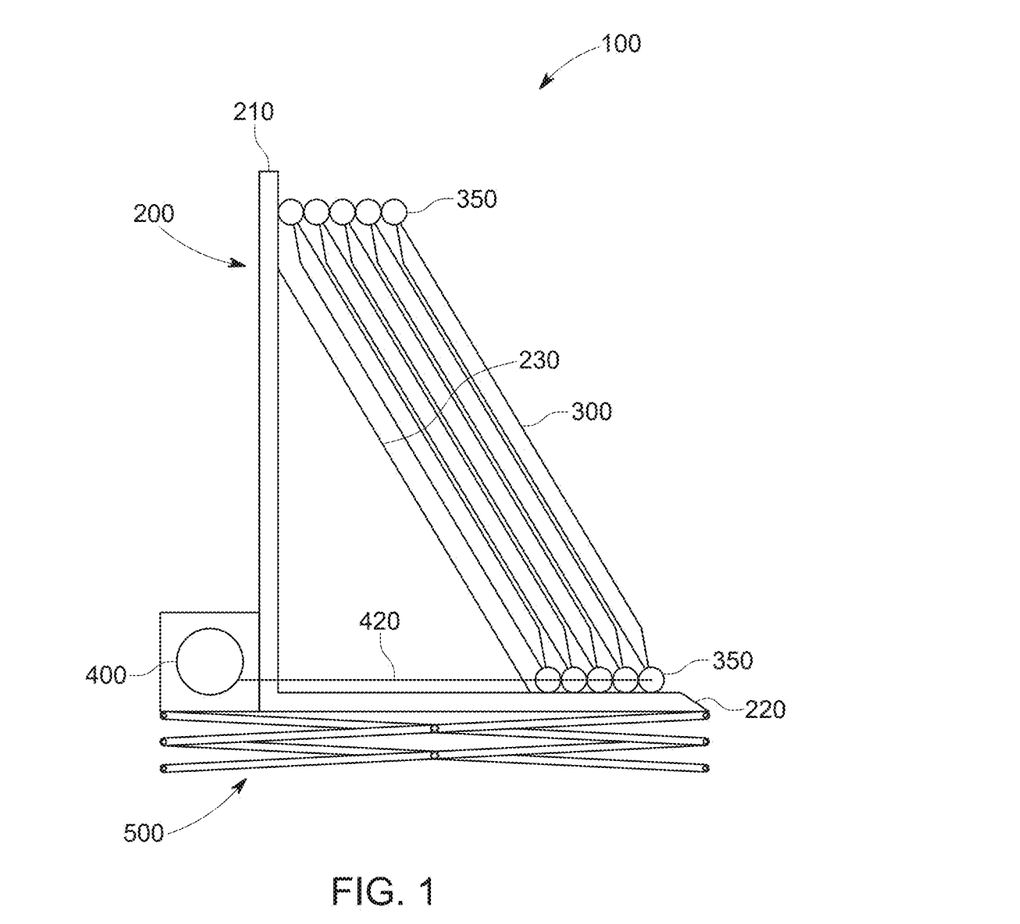
FIG. 1 is a side view illustrating the deployable solar panel system for trucks.

FIG. 1 is a side view of one or more embodiments of the deployable solar panel system particularly configured for deploying onto an upper surface of a shipping container 130 of a truck 100. More specifically, the truck 100 may be a truck tractor. A truck tractor, as known in the art, is also known as a semi-truck or big rig, is a powerful vehicle designed to pull a semi-trailer, which is a trailer that relies on the tractor for part of its weight and support, rather than carrying cargo itself. A truck tractor consists of a power unit (e.g. engine and transmission) and a cab, but it doesn't have a cargo-carrying body of its own.

Figure 2:
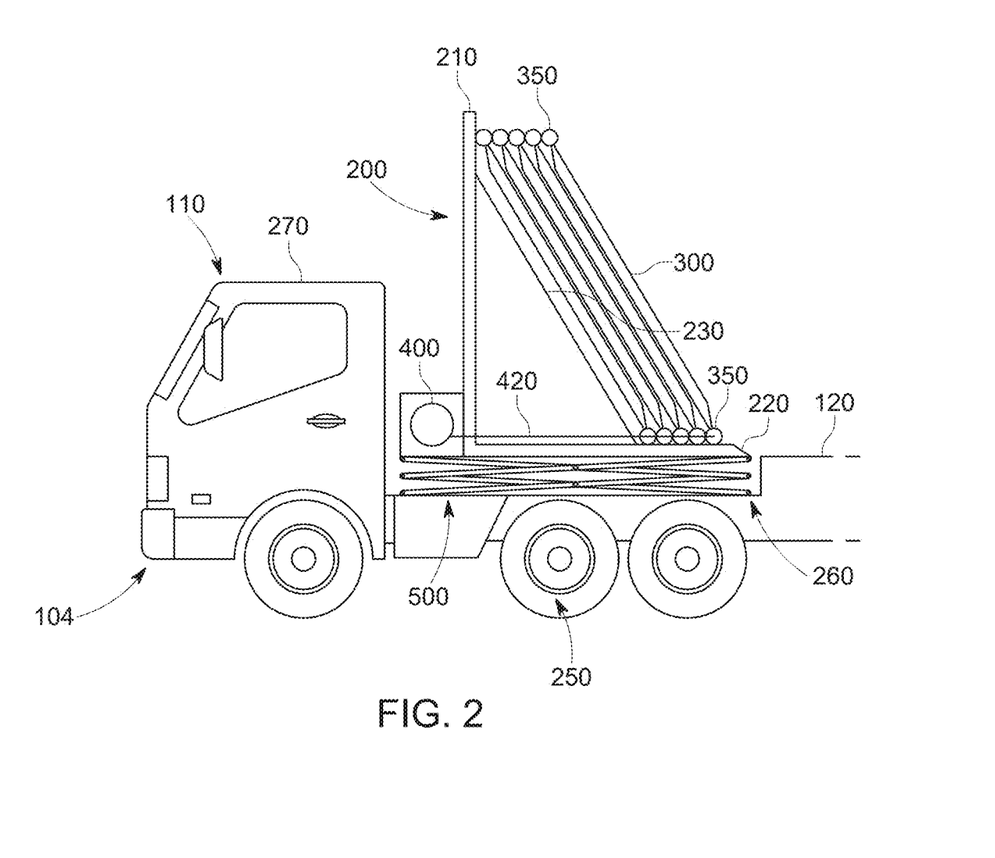
FIG. 2 is a side view illustrating the deployable solar panel system for trucks as installed on an exemplary truck.
Figure 3:
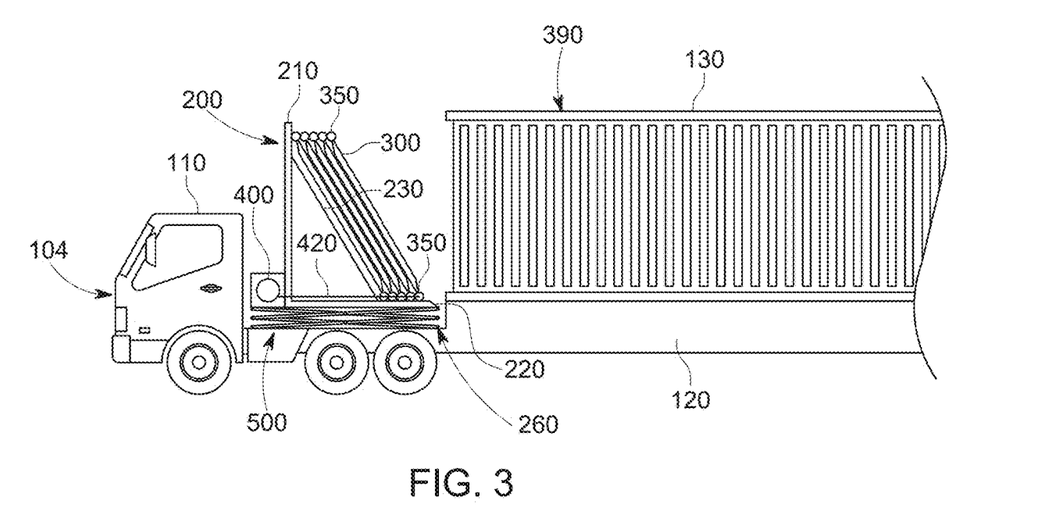
FIG. 3 is a side view illustrating the deployable solar panel system with the truck cabin placed near and/or in front of a container box.

FIG. 2 shows the deployable solar panel system installed behind the driver's cabin 110 of the truck 104, notably in the gap space 260 that separates the cabin 110 from the loading space 120 of a truck 104 for loading a shipping container or cargo container 130 as shown in FIG. 3. The gap space 260 may extend behind the cabin 110 and be a surface or area above the wheels 250 of the truck 104. The gap space 260 may be located in front of or ahead of the loading space 120 of the truck 104, whereby the loading space 120 is configured to receive and hold a shipping container 130.

It is noted that as used herein the term "cabin" may refer to a driver's compartment in the front of the truck, where the driver sits and operates the vehicle; essentially, it's the "cab" of the truck, the area where the driver controls the truck and is considered the primary living space while on the road. The cabin 110 of the truck 104 houses the steering wheel, dashboard, seats, and other controls needed to drive the truck 104. "Cabin" and "cab" are often used interchangeably in trucking to refer to the driver's compartment of the truck 104.

The terms "shipping container" and "cargo container" or "freight container" are also used interchangeably herein.

Figure 8:
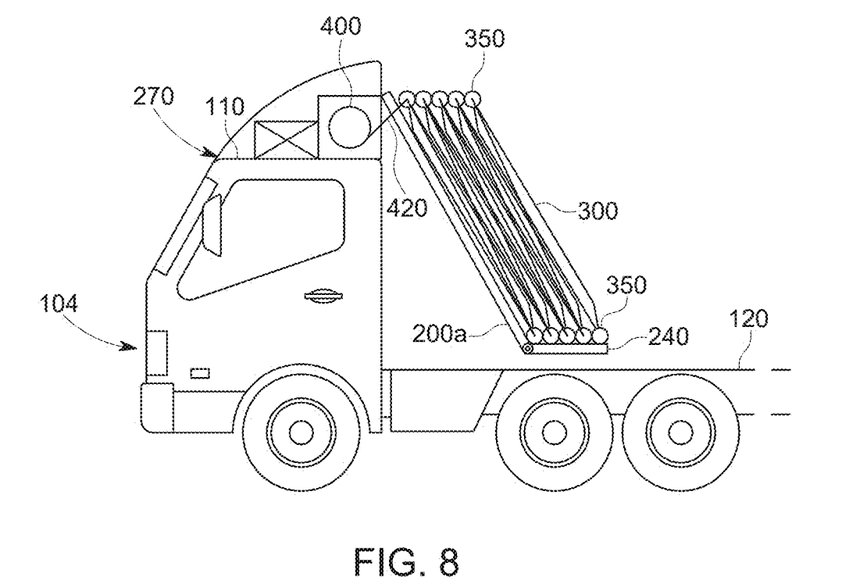
FIG. 8 is a side view illustrating the deployable solar panel for trucks installed on an upper surface of a cabin of truck.
Figure 9:
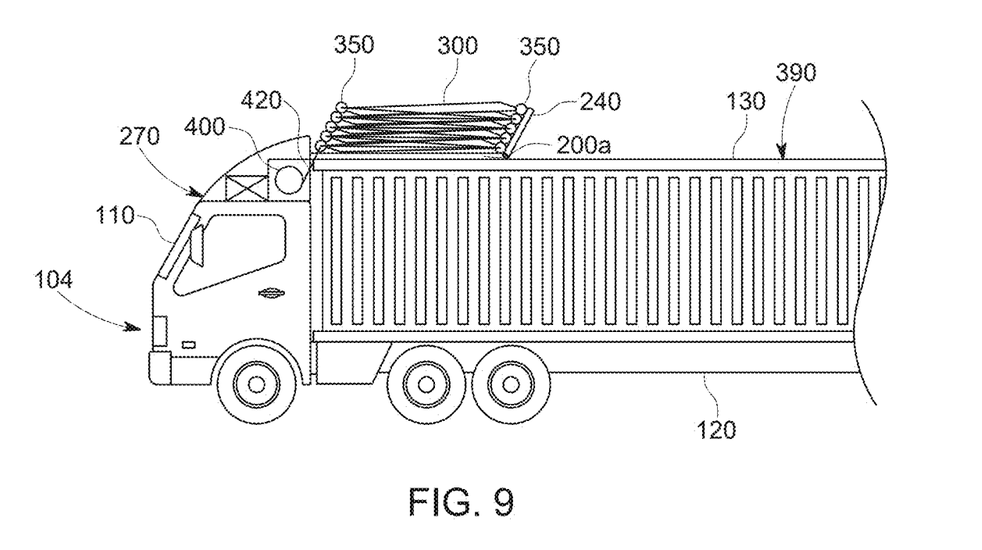
FIG. 9 is a side view illustrating an alternative location for the deployable solar panel system for trucks with the container box of the solar panel system placed on an upper surface of the cabin of the truck.
Figure 10A:
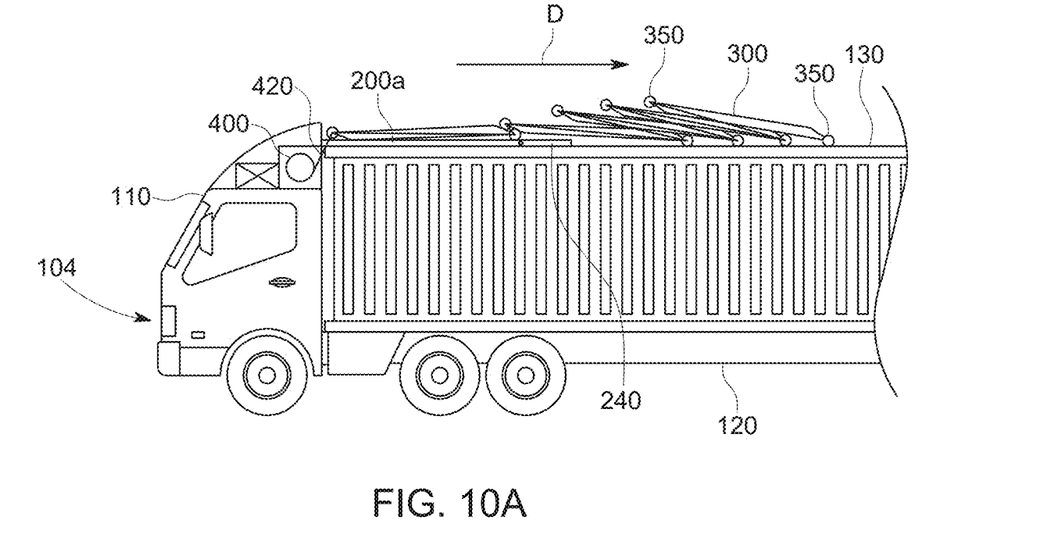
FIG. 10A is a side view illustrating the deployable solar panel system for trucks while deploying on the upper surface of the shipping container.

In a non-limiting embodiment, the upper surface 270 of the cabin 110 may be empty as shown in FIG. 2. Alternatively, in another configuration, the deployable solar panel system 100 (e.g. as shown in FIG. 1 and/or FIG. 10B) attached to the upper surface 270 of the cabin 110 as shown for example in FIG. 8, FIG. 9, and FIG. 10A. In a non-limiting embodiment, the upper surface 270 may further include a wind deflector, which is usually a plastic panel that deflects rain or wind away from the windshield or windows or other parts of the cabin 110.

Figure 10B:
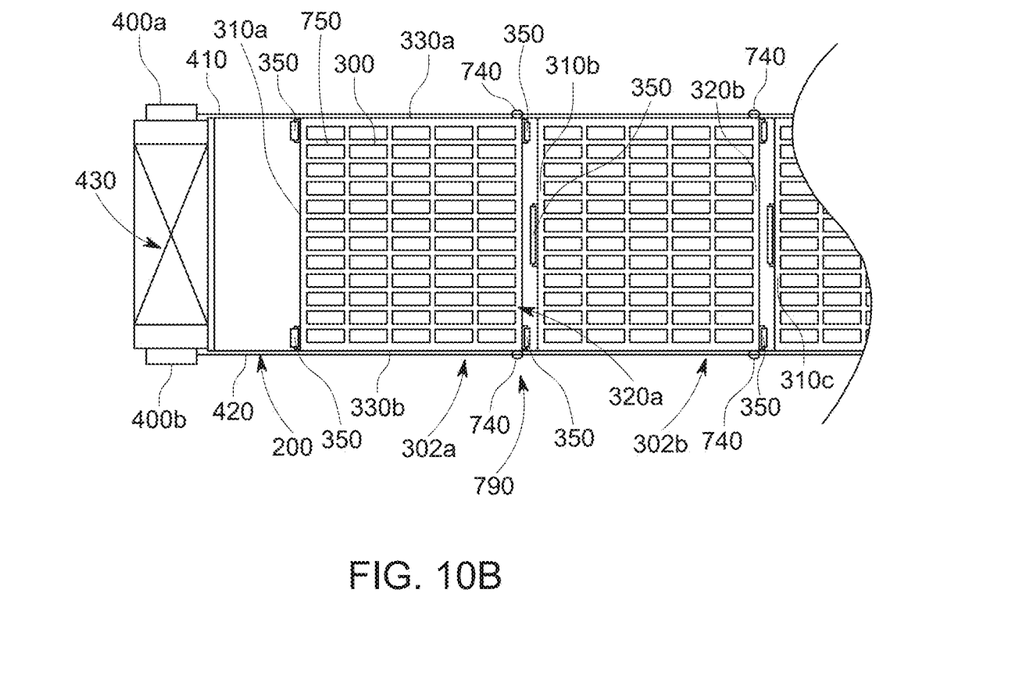
FIG. 10B is a plan view illustrating the deployed state of the solar panel system for the embodiment shown in FIGS. 8-10B.
Figure 10C:
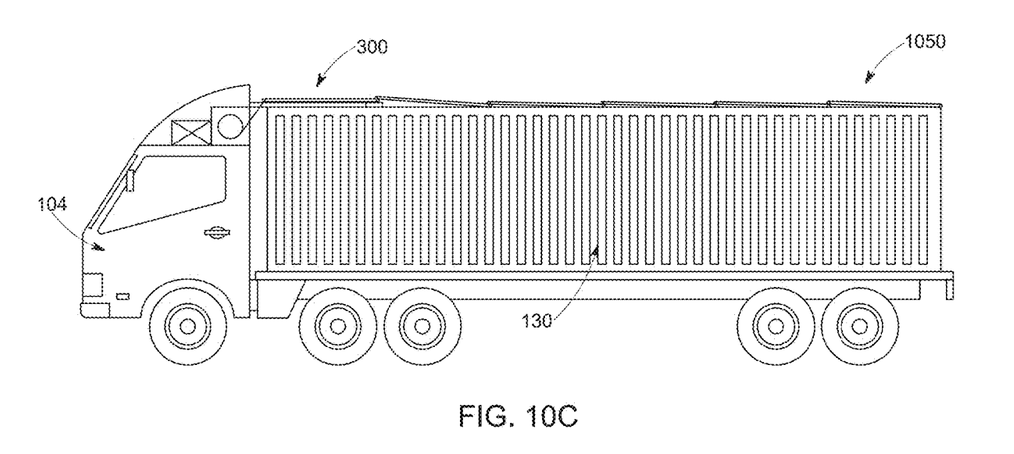
FIG. 10C is a side view illustrating the deployed set of connected solar panels fully extended over a top surface of a shipping container of a truck.

The system 100 includes, but is not limited to, a guide bracket 200, multiple solar panel modules 302 that form a connected set of solar panel modules 300, a pair of winches 400 (e.g. 400a, 400b as shown in FIG. 10B), tension ropes, such as tension ropes 410 and 420, and a lifting mechanism 500 to lift the above mentioned components. It is noted that there does not have to be a pair of winches 400, but rather a single winch 400 may alternatively be utilized to expand and retract the solar panel modules 300.

Figure 7A:
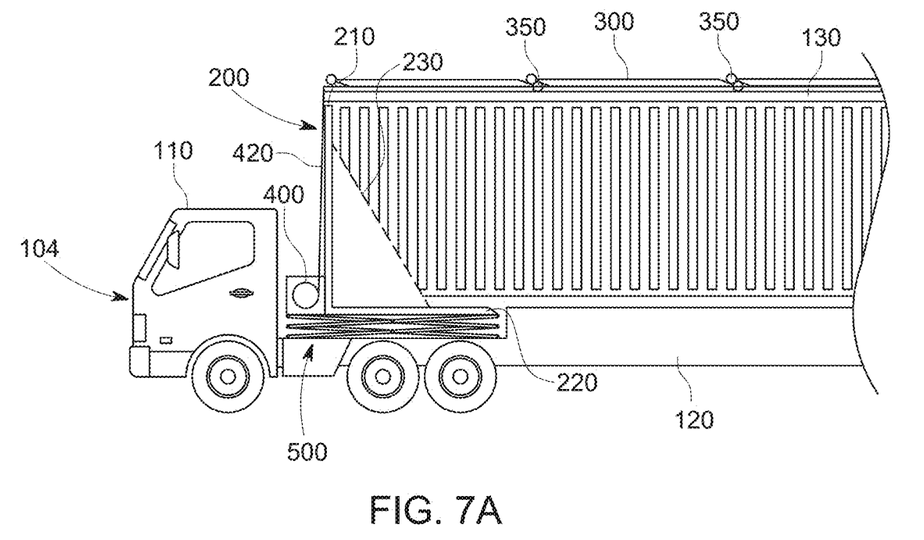
FIG. 7A is a side view illustrating the deployable solar panel system for trucks with the guide bracket of the solar panel system lowered as the lifting device descends and the shipping container is moved towards and inside the guide bracket in the deployed state on the upper surface of the shipping container.
Figure 7B:
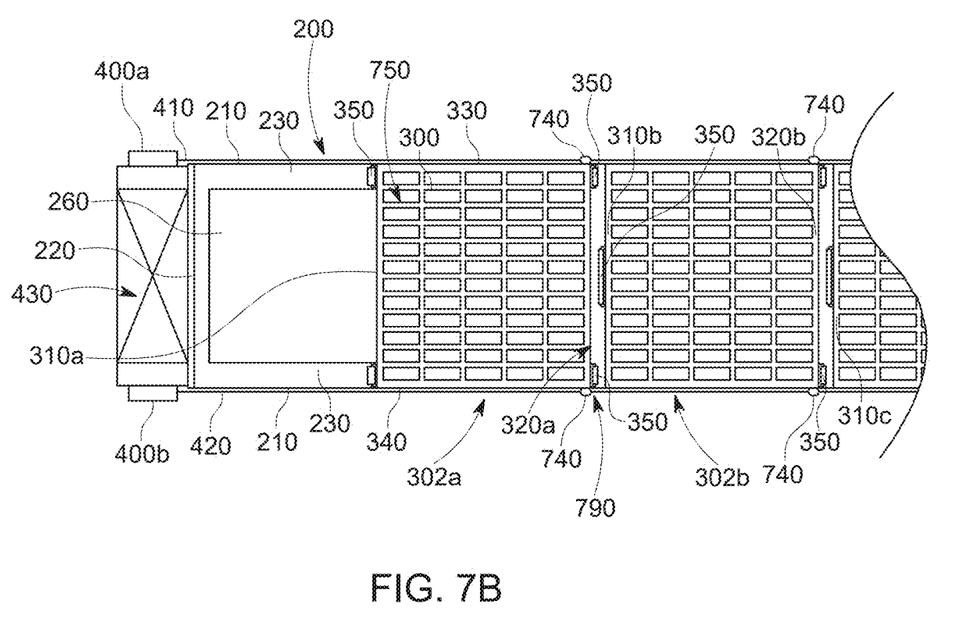
FIG. 7B is a plan view illustrating the deployed state of the deployable solar panel system using the system as attached in a gap space at a rear of a cabin of a truck.

The solar panel modules 302 individually are composed or may include multiple individual solar panel cells 750, as shown for example, in FIG. 7B. The solar panel modules 302 are configured to use sunlight to produce electricity. They are made of semiconductor materials like silicon, which release electrons when exposed to light. As known in the art, solar panel modules 302 work when sunlight hits the solar panel 302. Photons from the sun collide with silicon atoms in the solar panel 302. Electrons are released and flow through the solar panel 302. This flow of electrons creates an electric current. The current is captured by wiring in the solar panel 302. An electrical equipment 430, which may be a transformer or an inverter in one or more non-limiting embodiments (e.g. as shown figuratively in FIG. 7B) can be useful to increase or decrease the voltage level or to convert the direct current (DC) electricity to alternating current (AC) in some embodiments. The electrical equipment 430 may be located on a top of the cabin 110 in one or more non-limiting embodiments, or alternatively may be located in other positions on the driver's cabin 110.

Firstly, the configuration of the expandable solar panel system 100 for trucks 104 according to an embodiment of the present invention can be broadly divided into the following components: a guide bracket 200 installed at the rear or behind the driver's cabin 110 of the truck 104, having multiple solar modules 302 connected to each other to form a deployable connected set of solar panels 300 that is accessible from these guide brackets 200, and a winch 400 that winds or unwinds tension ropes, such as tension ropes 410 (e.g. as shown in FIG. 7B) and tension rope 420, as shown for example in FIGS. 1-10B that function to help connect the solar modules 302 together. Notably, one or both of the tension ropes 420 may contain or be made of electric wire, which is used to help transmit electric energy stored by the solar panels 300 to the battery or other electric components of the cabin 110 of the truck 100.

Figure 4:
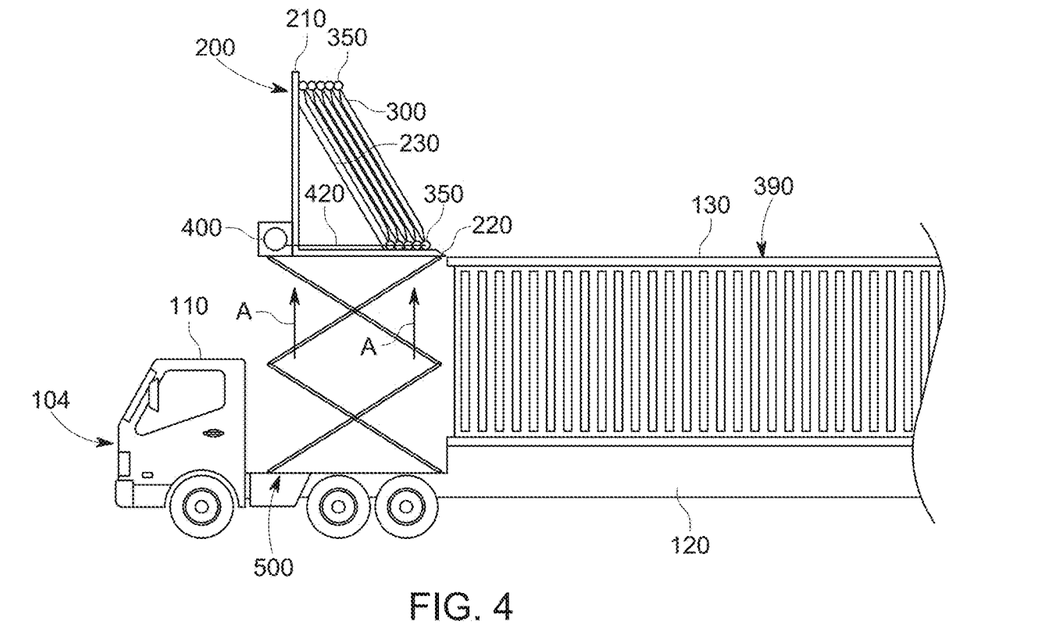
FIG. 4 is a side view illustrating the deployable solar panel system for trucks with the container box and the guide bracket of the solar panel system raised as the lifting device ascends.

The guide bracket 200 can be operated by a lifting device 500 as shown in FIG. 1 and FIG. 3 and FIG. 4 which show the lifting mechanism/device 500 being used to raise the entire system 100. The lifting mechanism or device 500 is a type of lift as known in the art used to raise structures. In a non-limiting embodiment, the lifting mechanism 500 may be a scissor type lift mechanism but any other type of lifting mechanism may alternatively be used, including, but not limited to, a hydraulic lifter and/or a rack and pinion lifter.

As known by one of ordinary skill in the art, a winch 400 is a mechanical device that uses a rope or cable to pull, lift, or lower loads. Winches are used in many industries, including construction, waste removal, and marine craft. In a non-limiting embodiment, the electrical equipment 430 as shown in FIG. 7B may be placed near or in between the middle of the winches 400. Winch 400 may include a drum, motor, gear train, and cable or tension ropes 410, 420.

It is noted that in a non-limiting embodiment, electricity may be transferred from the solar panels 300 to the battery of the truck through an inverter (e.g. or other electrical equipment) 430. In a non-limiting embodiment, one or both of the tension ropes 410, 420 may be an electric wire for transmitting the electricity to the battery contained in the cabin 110. Alternatively, the inverter or other type of electrical equipment 430 may comprise the tension ropes 410, 420 and extra electric wire.

The cables or tension ropes 410, 420 may be attached to one or more ends of the set of connected solar panel modules 300. The other end of the cables or tension ropes 410, 420 may be attached to the winch's 400 drum on the other end. As the motor of the winch 400 turns the drum, the cables or tension ropes 410, 420 spool the tension ropes 410, 420 onto or off of the drum. The tension created by the tension ropes 410, 420 moves the load (e.g. the set of connected solar panel modules 300) forward or backward to extend or retract the set of connected solar panel modules 300 as needed onto the upper surface 390 of the shipping container 130 (e.g. as shown in FIGS. 5-6 or FIGS. 9-10A) and/or to retract the set of connected solar panel modules 300 as shown for example in a retracted position in FIG. 3.

In a non-limiting embodiment, the guide bracket 200 is comprised of a vertical surface or part 210 with a certain height and a horizontal surface or part 220 which extends horizontally away from the vertical surface 210. The vertical wall 210 may be approximately or generally perpendicular to the horizontal surface 220. One or more rails 230 can be configured to connect the interior upper part of the vertical surface 210 and the interior top surface of the horizontal surface 220. As shown in FIG. 1 and throughout, the rails 230 may be configured to be positioned in a sloping, angled manner with respect to the vertical surface 210 and the horizontal surface 220. These rails 230 may be configured as a pair, being offset from each other as located connecting the interior upper part of the vertical surface 210 and the interior top surface of the horizontal surface 220. The rails 330 are stationary and are meant to support the angled solar panel modules 302 when the solar panel modules 302 are in a retracted position and a stowed position as shown in FIGS. 2-4 for example.

The deployable solar panel system 100 may further include a set of connected solar panel modules 300 made up of individual solar panel modules 302

Figure 7C:
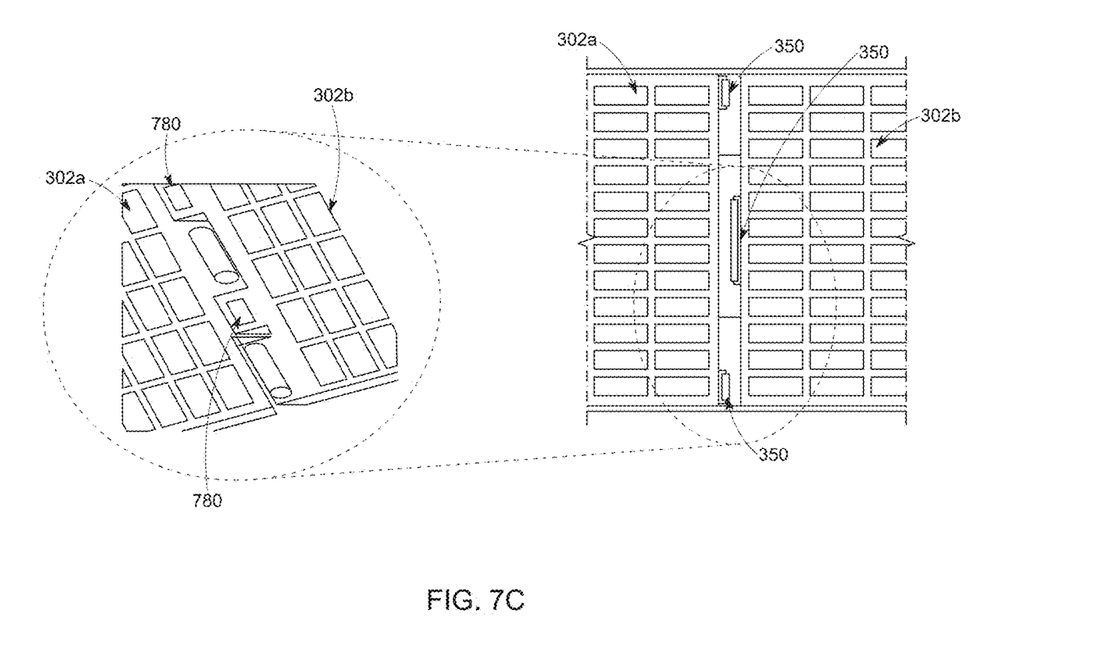
FIG. 7C shows an example plan view of magnets used to attach the solar panels to each other.

FIG. 7C shows a non-limiting embodiment in which magnets 780 are placed on either side of a centrally placed roller 350. The magnets 780 may be used to help create a magnetic connection between each solar panel 302 that are aligned horizontally above the top surface of the top of the shipping container 130. The magnets 780 may be able to cause the solar panels 302 to attach together when deployed over the top of the shipping container 130 and detach quickly when the solar panels 302 are wound back up and returned to a stowed position (e.g., as shown in FIG. 2).

The individual solar panel modules 302 are configured to fold together in a stored position (e.g., as shown in FIG. 2) and then to be deployed in an expanded position as shown in FIGS. 5-7A, FIG. 9, FIG. 10A, and FIG. 10C. The solar panel modules 302 are supported on the rails 230 that are affixed to both the vertical surface 210 and the horizontal surface 220 that make up the guide bracket 200.

The solar modules 302 can be configured in a roughly rectangular shape, composed of solar cells that convert sunlight into electricity. This generated current can be converted into power. With this power, in the case of electric trucks (e.g., electric trucks 104), the driving range can be extended. For refrigerated or freezer trucks, power can be supplied for refrigeration or freezing. General trucks can also be supplied with necessary power via the solar power provided from the connected solar panels 302 that form the set of solar panels 300. Further, the power generated from the solar panel may be stored in batteries or channeled to another storage site to supply power for multiple places and people and is not limited solely to use by the truck.

Multiple rollers 350 may be installed and attached to a lower end and an upper end of one or more of the connected solar panels 302 to facilitate the combined, coordinated action of the connected solar panels 302 as shown for example in FIGS. 1-10C.

Each solar module 302 can be in the shape of a rectangle composed of a short side and a long side. In a non-limiting embodiment, the rollers 350 can be installed at opposite ends of each solar panel 302 as shown in FIG. 7B. Rollers 350 may also be installed at the center of one of the sides of the solar panel 302 as shown in FIG. 7B.

Rollers 350 do not need to be of a specific shape but can be configured in various forms to facilitate simultaneous or almost simultaneous folding and unfolding action of the connected set of solar panel modules 300 along the upper surface 390 of the shipping container 130. Rollers 350 installed at the corner of an interior side 310a of a solar panel module 302a that is adjacent to another solar panel module 302b may move along the surface of adjacent solar modules 302, so it is desirable to make them wide to ensure stable folding and unfolding action as a whole connected set 300. To prevent damage to the surface of the solar panel modules 302 when folding and unfolding, it may also be preferable to make the surface of the rollers 350 from a soft material so as to avoid scratching the solar panel cells 750 (e.g. as shown in FIG. 10B).

Additionally, when rollers 350 installed at the center of the first side 310 of a solar panel module 302a move along the surface of adjacent solar modules 302b (e.g., as shown in FIG. 7B), the axis connecting the first side 310 and the rollers 350 can be designed to have elasticity, allowing it to move vertically to prevent damage to the surface of adjacent solar modules 302b due to pressure. Each solar panel module 302 can be composed of multiple units of the same shape. In a non-limiting embodiment, the first panel 302a has rollers 350 on every corner of the panel 310a and 320a to deploy the rollers 350 smoothly because the top 310 of the solar panel 302a needs to be able to slide down on the slope 230 unlike other solar panels. The other solar panels 302 may have a roller 350 in the middle of the top edge 310b. These solar panel modular units 302 as a grouped, connected set 300 can be unfolded from their retracted, stowed position (e.g. as shown in FIG. 2) from the guide bracket 200 via the one or more winches 400a, 400b and tension ropes 410, 420. Additionally, the solar panel modules 302 can be configured to be stacked inside the guide bracket 200 without overlapping but rather being stacked vertically against each other as shown for example in FIG. 2 and in FIG. 3.

The winches 400 serve as a means to unfold or fold multiple solar modules 300 and can be operated through a driving mechanism such as a motor. Tension ropes 410, 420 with elasticity are wound around the winches 400 for installation. FIG. 10B shows a pair of winches 400a, 400b that are placed aligned with each other or opposite each other on the loading space 260 of the cabin 110 of the truck 104. In a non-limiting embodiment, there may be a pair of winches 400 or there may be a single winch 400 attached to or installed upon an upper surface 270 of the cabin 110 of the truck 104, which is shown for example in FIGS. 8-10A.

The winches 400 can be installed in pairs facing underneath the vertical surface or part 210 of the guide bracket 200. A first winch 400a may have the long tension rope 420 attached to the first winch 400a, as shown for example in FIG. 10B, and a second winch 400b may have the other long tension rope 410 attached to the second winch 400b. It is noted that FIG. 10B shows the top view of the extended solar panel modules 302 as they may appear whether the deployable solar panel system 100 is installed originally on a loading space 260 behind or at the rear of the cabin 110 of the truck 104 or whether the deployable solar panel system 100 is installed on the upper surface 270 of the truck 104.

Optionally, the system 100 can be configured to have one winch 400 with both the first tension rope 420 and the second tension rope 410 attached to the single winch 400.

Reviewing FIGS. 1-7B, FIGS. 1-7B illustrate the deployable solar panel system 100. In particular, FIGS. 2-7B relate to the embodiment in which the deployable solar panel system 100 is mounted or installed or attached on a gap space 260 which has a surface with a gap between the rear of the cabin 110 and a front side of the shipping container 130. As shown in FIG. 3, the shipping container 130 may be eventually loaded onto the loading space 120 that is intended to be behind the driver's cabin 110 of the truck 104 and configured to be driven by the truck 104 to an intended destination. In a non-limiting embodiment, the solar panel system 100 may be installed onto the back space or rear gap space 260 of the cabin 110 of the truck 104. The truck 104 may be driven close to the shipping container 130 and connected to the shipping container 130 directly and/or a loading space 120 on which the shipping container 130 is already attached or located. The solar panel system 100 may be deployed in a non-limiting embodiment while the shipping container 130 is disconnected from the rear 260 of the truck 104 or while the shipping container 130 is connected to the rear 260 of the truck 104.

Advantageously, the ability for several solar panel modules 300 to be deployed and extended over the upper surface 390 of a shipping container 130 and then to retract the same connected set of solar panels 300 to provide primary or supplemental power either to the truck 104 directly and/or to store in the solar panels 300 for later conversion and use to power other structures or entities is highly desirable. One of the advantages offered by the current system 100 is not having to disconnect and reattach individual solar panels 302 above an upper surface 390 of a shipping container 130 of a truck 104. Another advantage is that the system 100 takes up a relatively small footprint if installed either at a rear gap space 260 of the cabin 110 of a truck 104 or if the system 100 is attached to the upper surface 270 of the cabin 110.

FIG. 1 illustrates various components as noted above of the deployable solar panel system 100. FIG. 2 illustrates the system 100 as loaded and installed and attached fixedly behind the cabin 110 and on the gap space surface 260 of the cabin 110. The cabin 110 is intended to be connected to a loading space 120 which can contain a shipping container 130. In a non-limiting embodiment, the cabin 110 of the truck 104 is separately detachable from the loading space 120. In other embodiments, the cabin 110 may not be detachable from the loading space 120.

FIG. 3 shows that the lifting mechanism 500 may be in a retracted, lowered position. In a non-limiting embodiment, the retracted and stowed set of solar panel modules 300 are contained as a set within the interior of the guide bracket 200. The vertical surface 210 and the horizontal surface 200 of the guide bracket 200 help to hold the solar panels 300 in place as do the rails 230 which surface in a fashion as end caps or barriers to block the solar panels 300 from falling off either side from behind the cabin 110 of the truck 104. In a non-limiting embodiment, the main purpose of the sloping rails 230 is to store the solar panels 300 in an angled/sloped manner for storing the panels 300 with a smaller footprint or taking up less space. When the winches 400 unwind the tension ropes 410 and 420, gravity causes the solar panels 300 to deploy automatically.

FIG. 4 shows that the lifting mechanism 500 may be actively raised upwards in the direction of arrows A as shown in FIG. 4. The goal may be to raise the entire deployable solar panel system 100 to some position above (e.g., slightly above) the upper surface 390 of the shipping container 130. Accordingly, the lifting mechanism 500 is able to raise the system 100 to at least the height of the shipping container 130 or higher. Alternatively, the lifting mechanism 500 may raise the system 100 at level with the upper surface 390 of the shipping container 130. The goal or intention is to provide room for the connected set of solar panel modules 300 to unfold and extend over the upper surface 390 of the shipping container 130. FIG. 4 shows that the entire guide bracket 200, the attached winches 400, and the lifting mechanism are attached to the gap space 260 at the rear of the cabin 110 of the truck 104, but that the guide bracket 200, the winches 400 are raised up in the air on the lifting mechanism 500 to some level above or at level with the upper surface 390 of the shipping container 130.

Figure 5:
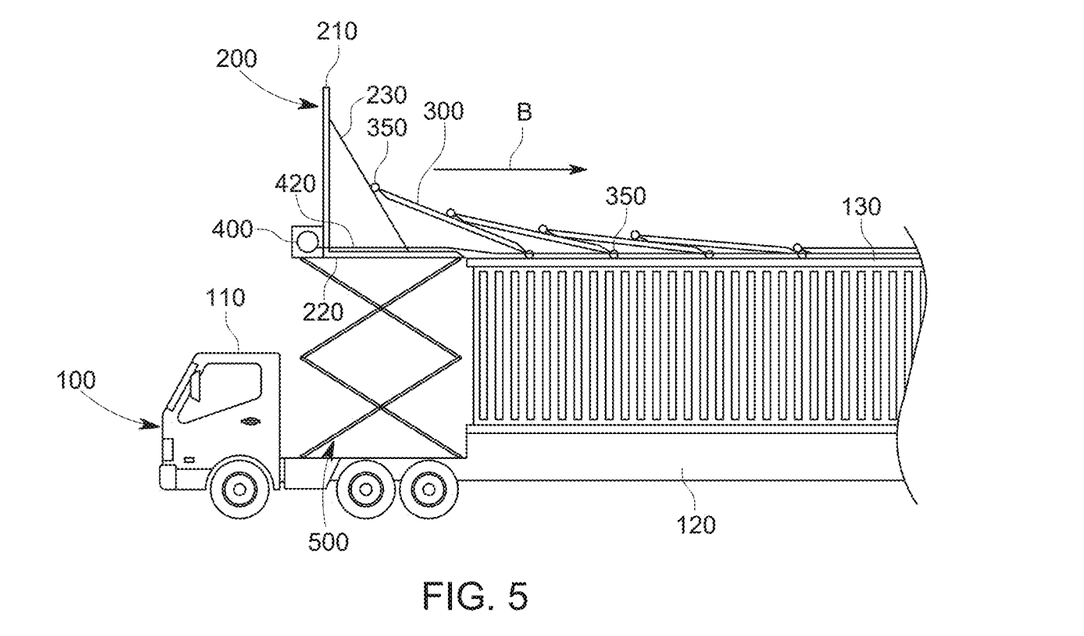
FIG. 5 is a side view illustrating the deployable solar panel system for trucks in the deployment state on the upper surface of the container box.

FIG. 5 shows that the winches 400 (e.g. winch 400a, winch 400b) may be activated. It is noted that one or more controllers of the winches 400 and/or lifting mechanism 500 may be located in a single control module or control box that may be located inside of the driver cabin 110 or exterior to the cabin 110.

Upon activation of the winches 400, the tension ropes 410, 410 are activated and start moving forward in the direction of arrows B to cause the connected set of solar panel modules 300 to extend over the upper surface 390 of the shipping container 130.

Figure 6:
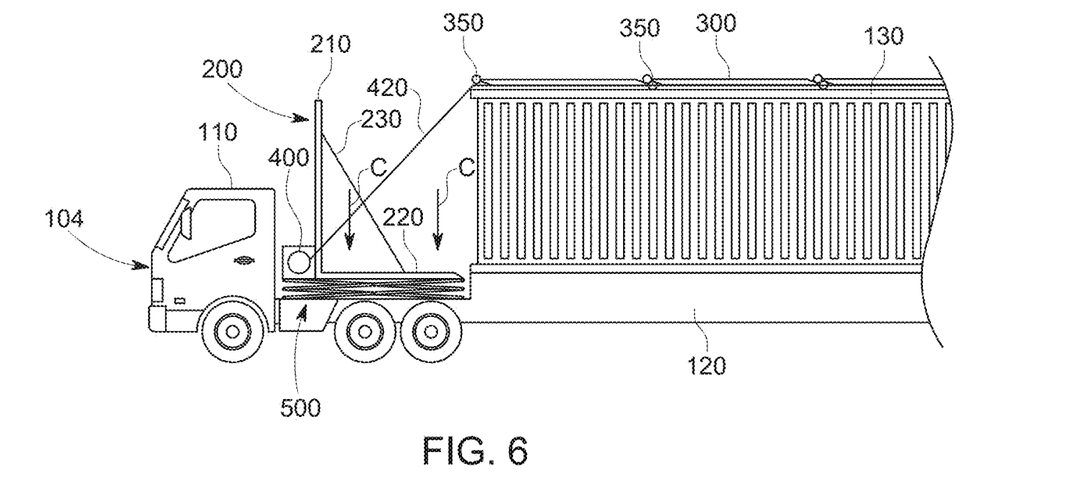
FIG. 6 is a side view illustrating the deployable solar panel system for trucks with the guide bracket of the solar panel system lowered as the lifting device descends while in the deployed state of the upper surface of the shipping container.

FIG. 6 shows that the lifting mechanism 500 may be lowered in the direction of arrows C such that the lifting mechanism, the winches 400, and the guide bracket 200 as a whole return to their original position as positioned over the gap surface 260 at the rear of the cabin 110 of the truck 104. The tension ropes 410 and 420 would remain attached and taut and connected between the winches 400 and the solar panel modules 300, as shown for example in FIG. 6, which shows tension rope 420 on the proximate side of the truck 100.

FIG. 7A shows that the solar panel modules are fully extended over the upper surface 390 of the shipping container 130 and fully deployed. In a non-limiting embodiment, the shipping container 130 may be pulled into the space of the guide bracket 200 that had been occupied by the connected set of solar panel modules 300. FIG. 7A shows how the shipping container 130 has been pulled in closer towards the rear of the cabin 110 of the truck 104. This may be by virtue of the power and pull force applied by the winches 400 and the connected tension ropes 410, 400 and/or further exertion on a rear of the shipping container 130 to push the shipping container 130 in place such that the shipping container 130 with the deployed and extended solar panel modules 300 over the upper surface 390 of the shipping container 130 is closer and/or contacting the vertical surface 210 of the guide bracket 200. The rails 230 may help to keep the shipping container 130 in place as well on the loading space 120 and behind the cabin 110 of the truck 104 (e.g., as shown in FIG. 7B).

FIG. 7B shows a top view of an exemplary illustration and embodiment of the extended solar panel modules 300 as located over the upper surface 390 of a shipping container 130.

FIG. 7A and FIG. 7B both show that multiple rollers 350 may be positioned at each corner 790 of an individual solar panel 302 (e.g., solar panel 302a, 302b). The rollers 350 act to help the connected solar panels 300 extend fully and unfold as a unit and the rollers 350 help to ensure the connected solar panels 300 roll out smoothly and sequentially. In addition to the rollers 350 placed at each corner 790 or one or more corners 790 of each solar panel module 302, there may be at least one roller 350 or a combination of rollers 350 placed in other locations. In a non-limiting preferred embodiment, the first panel 302a may have a roller 350 located on each corner of the first solar panel 302a. Subsequent solar panels, such as solar panels 302b and 302c may have a centrally placed roller 360 placed on each interior facing side 310 a solar panel module 302 as shown for example in FIG. 7B. The interior side 310 is different from the lateral or exterior facing left side 330 and right side 340 of each solar panel module 302. The first panel 302a may have the roller 350 on every edge side 310a and 320a, equaling four rollers total. After the first panel 302a, one roller 350 may be located in the middle of the edge 310b to avoid interfering with the rollers 350 of the first panel 302a. The other edge 320a and 320b have the rollers 350 on each edge, two total, to avoid interference with the second and third panel and smoothly sliding down on the sliding rails 230.

In a non-limiting embodiment, the centrally placed rollers 350 are configured to cause the solar panel modules 300 to roll centrally along an upper surface 390 of the shipping container 130 and to also roll onto each other in order to overlap and/or line up with each other as needed when stowed and/or when extended.

Further, each tension rope 410, 420 may run through one or more protruding loops 740 that protrude from one or more corners 790 of each solar panel 302. The protruding loops 740 may act as a piece or part that has a hole extending therethrough. The tension ropes 410, 420 may be run through the loops 740 by the manufacturer when the solar panels 302 are initially connected to each other and to the tension ropes 410, 420 of the winches 400 to form the deployable solar panel system 100.

As shown in FIG. 7B, the first tension rope 410 may be unwound from the first winch 400a, whereby in a non-limiting embodiment, the first tension rope 410 weaves through or runs through the loops 740 of the solar panels 300 along a long left side 330 of the system 100 and the truck 104. Similarly, the second tension rope 420 may be unwound from the second winch 400b, whereby in a non-limiting embodiment, the second tension rope 420 weaves through or runs through the loops 740 of the solar panels 300 along a long right side 340 of the system 100 and the truck 104. Alternatively, the tension ropes 410, 420 may be coupled to each solar panel module 302 in another manner. When the winches 400a, 400b are rotated accordingly, the solar panels 300 may extend over the upper surface of the shipping container 130, and when the direction of rotation of the winches 400a, 400b is reversed, the solar panel modules 300 retract to their stowed, retracted position as shown in FIGS. 2 and 3 for example. It is noted that there may be a fixing means to affix the last solar panel module, such as solar panel module 1050 to the upper surface 390 of the shipping container 130 to prevent that last solar panel module 1050 from moving in an uncontrolled manner. There may be other retractable locks and latches used to hold one or more additional solar panel modules 302 in place when extended over the upper surface 390 of the shipping container 130 to prevent the unnecessarily floating or detaching of the unfolded solar modules 302 from the top surface 390 of the shipping container 130.

When it is needed to retract the multiple solar panel modules 300 that are unfolded to extend outside the guide bracket 200, the winches 400 may be wound up in an opposite direction thus winding up the first tension rope 410 and second tension rope 420 through operation in the opposite direction. As a result, the long sides 330, 340 of the solar modules 300 connected along the length of the first tension rope 410 and the second tension rope 420 are pulled inward, assisted by the rollers 350 installed at the center of the first side 310 of each solar panel module 302 after the first solar panel 302a, thereby causing adjacent solar modules 302 to fold over each other. It is noted that the system 100 has a small profile and footprint and is visually appealing in how the components fit together and how the solar panels 302 are configured to fold and unfold as needed over the upper surface 390 of the shipping container 130.

Meanwhile, in another embodiment, as illustrated in FIGS. 8-10B, a guide plate 200a can be rotatably installed at the rear top of the cabin 110 of the truck 104. Multiple solar modules 300 that can be folded or unfolded to overlap each other can be installed on this guide plate 200a. At the rear of the guide plate 200a, automatic or manual rotation latches 240 can be installed to support the installed solar modules 300 and prevent detachment.

Furthermore, one or more winches 400 driven by a motor or similar driving means can be installed on the upper part of the cabin 110. This winch 400 can wind or unwind the first tension rope 410 and the second tension rope 420, thereby folding or unfolding multiple solar modules (300) connected through the first tension rope 410 and the second tension rope 420.

In this case, the winch 400 can be singular, and it can be configured to operate with both the first tension rope 410 and the second tension rope 420 installed together, or it can be configured in pairs, with each winch 400 having the first tension rope 410 and the second tension rope 420 installed separately.

It is noted that the roller 350 located in a center of an interior facing side, such as side 320a or 320b of a solar panel 302, may be a type of electric motorized wheel to further facilitate controlling, deploying and retracting of the solar panels 302 along a top of the shipping container 130. Additionally, in other embodiments, all of the rollers 350 may be electric motorized wheels.

As shown in FIGS. 8-10B, the solar module 300 can have multiple rollers 350 installed to slide down smoothly. For example, rollers 350 can be installed at the opposite ends of both sides of the interior sides 310 and the opposite ends on the corners of each solar panel module 302 (e.g. solar panel modules 302a, 302b as shown in FIG. 10B). Rollers 350 can also be installed at the center of the interior side 310a, 310b after the first panel 302a. It is noted that the use of rollers 350 for all embodiments, including embodiments shown in FIGS. 1-10C, can vary in shape and should be designed to exert pressure evenly along the surface of adjacent solar modules 300 to ensure stable folding and unfolding as a whole connected set. Additionally, the axis connecting the interior side 310a, 310b and the roller 350 can be configured to have elasticity to move vertically to avoid damaging the surface of adjacent solar modules 300 during movement with the rollers 350.

Moreover, the first tension rope 410 and the second tension rope 420 are wound or unwound by the winch 400 and can be designed to be elastic. The first tension rope 410 can be connected to both ends of each long side 330, 340 of multiple solar modules 300 to sequentially connect them, or protruding loop devices (e.g. loops 740) can be formed at both ends of each long side 330, 340 with the first tension rope 410 passing through one or more loops 740 and fixed at the end of the last solar panel module 302. Similarly, the second tension rope 420 can be connected to both ends of each long side 330, 340 of multiple solar modules (300) to sequentially connect them, or loops can be formed at both ends of each long side 330, 340 with the second tension rope (420) passing through the loops and fixed at the end of the last solar module 300. In this case, the roller 350 formed at the center of the interior side 310a, 310b can be configured to move along the long side 330, 340 of adjacent solar modules 300.

Therefore, when the solar modules 300 are folded and placed on the guide plate 200a to prevent detachment through the rotation latch 240, and when these solar modules 300 are deployed on the top surface of the shipping container 130, the guide plate 200a is rotated upwards in advance to create space at the rear of the cabin 110 before installing the shipping container 130 and/or the cargo in the loading compartment 120 of the truck 100. Then, by opening the rotation latch 240 of the guide plate 200a positioned on the top surface of the shipping container 130 and driving the winch 400, the first tension rope 410 and the second tension rope 420 are released, sequentially deploying multiple solar modules 300 on the top surface of the shipping container 130.

The deployment of the solar modules 300 can be achieved by manually pulling while operating the winch 400, by moving the vehicle to cause interaction for deployment, or by configuring the top surface of the guide plate 200a to have a slope, allowing the solar modules 300 to slide by gravity during deployment.

When folding the deployed solar modules 300 back to overlap, the winch 400 can be operated in the opposite direction to wind the first tension rope 410 and the second tension rope 420, causing the unfolded solar modules 300 to fold back onto the top surface of the guide plate 200a. By closing the rotation latch 240, the solar modules 300 can be stored on the guide plate 200a.

As stated above, the present invention provides a deployable solar panel system for a truck whereby the solar panels 302 do not have to be disconnected from a top of a shipping container 130 after being installed. Rather, the solar panels 302 are connected as a whole set 300 and are retractable using the tension lines 410, 420 and winches 400 that can retract the connected set of solar panels 302 to a stowed, retracting position in a simple, quick, and effective manner.

It is intended to describe in detail the configuration and operation according to a preferred embodiment of the present invention with reference to the drawings attached below. This is to facilitate those skilled in the art to implement the contents of the present invention with ease, without implying a limitation on the technical concept and scope of the present invention. Furthermore, when adding reference symbols to the components of each drawing, it should be noted that they have been designated with the same symbols. Additionally, terms specially defined considering the configuration and operation of the present invention may vary depending on the intention or convention of users and operators, and the definition of these terms should be judged based on the content throughout this specification.

Many advantages and benefits are offered by the one or more non-limiting embodiments of the system as described herein and shown in the accompanying details. In the Summary above and in this Detailed Description (is there a reason capitalizing the first letters?), and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, and steps, among others, are optionally present. For example, an article "comprising" (or "which comprises") components A, B, and C can consist of (i.e., contain only) components A, B, and C, or can contain not only components A, B, and C but also contain one or more other components. The term "set" as used herein may relate to one or more items.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted. The term "coupled to" as used herein may refer to a direct or indirect connection. The term "set" as used herein may refer to one or more items.

Specific details are given in the description to provide a thorough understanding of the embodiments. However, embodiments may be practiced without these specific details. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments are described as processes depicted as flow diagrams or block diagrams. Although each may describe the operations as a sequential process, many of the operations can be performed in parallel or concurrently. In addition, the order of the operations may be rearranged. A process may have additional steps not included in the figure.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A system comprising:
a deployable solar panel system mounted on a rear surface of a driver cabin for a truck, the deployable solar panel system further comprising:
a lift device positioned beneath a guide bracket, wherein the guide bracket comprises a vertical surface connected to a horizontal surface, wherein the vertical surface is connected to the horizontal surface of the guide bracket in a perpendicular manner;
electrical equipment comprising an inverter or a transformer;
one or more winches;
one or more tension ropes rotatably connected to the at least one winch, wherein at least one of the one or more tension ropes comprises an electrical wire that can conduct electric energy contained in a set of solar panel modules through the electrical equipment;
the set of solar panel modules attached to the guide bracket via the one or more tension ropes, wherein the set of solar panel modules is configured to be in either a stowed, retracted position or an expanded position in order to extend over an upper surface of a shipping container on the truck, wherein the set of solar panel modules is configured to fully retract together and once fully retracted, the set of solar panel modules are configured to be in the stowed, retracted position within an interior space of the guide bracket,
and further wherein the one or more tension ropes and/or the electrical wire are connected to the set of solar panel modules;
wherein the lift device is configured to raise the guide bracket to an elevated position,
wherein the set of solar panel modules is configured to expand and retract as a connected set, and
wherein each solar panel module of the set of solar panel modules is attached on multiple sides of the each solar panel module to the one or more tension ropes and/or the electrical wire.

2. The system of claim 1, further comprising, one or more rollers that are attached to corners or interior sides of a solar panel module of the set of solar panels modules.

3. The system of claim 2, further comprising, a centrally placed roller installed at a center of a side that joins the each solar panel module to another solar panel module of the set of one or more solar panel modules.

4. The system of claim 1, further comprising a set of rails, wherein the set of rails is attached at a top end of the set of rails to a top interior surface of the vertical surface of the guide bracket and the set of rails is also attached at a lower end of the set rails to a top interior surface of the horizontal surface of the guide bracket.

5. The system of claim 4, wherein the set of rails is affixed in a stationary manner to the vertical surface and to the horizontal surface of the guide bracket, wherein the set of rails is positioned within the interior space of the guide bracket at a slope or at an angle.

6. The system of claim 5, wherein when the set of solar panel modules is in the stowed, retracted position, the set of solar panel modules is also angled at a same slope or same angle as the set of rails.

7. The system of claim 1, wherein the one or more winches comprise a first winch and a second winch, wherein the one or more tension ropes sequentially connect corners of each solar panel module of the set of solar panel modules, wherein a first tension rope extends from the first winch and a second tension rope extends from the second winch, wherein the first tension rope sequentially and fixedly connects each solar panel module with another adjacent solar panel module of the set of solar panel modules along a first longitudinal side and wherein the second tension rope also sequentially and fixedly connects each solar panel module with another adjacent solar panel module of the set of solar panel modules along a second longitudinal side.

8. The system of claim 7, wherein the one or more tension ropes sequentially connects corners of each solar panel module of the set of solar panel modules.

9. The system of claim 7, wherein one or more protruding loops are integrated into one or more corners of each solar panel module, and wherein the first tension rope runs through each protruding loop of the one or more protruding loops along the first longitudinal side.

10. The system of claim 7, wherein one or more protruding loops are integrated into one or more corners of each solar panel module, and wherein the second tension rope runs through each protruding loop of the one or more protruding loops along a second longitudinal side.

11. The system of claim 1, wherein a last solar panel module of the set of solar panel modules as unfolded from the guide bracket is equipped with a fixing means to fix the last solar panel module in place on the upper surface of the shipping container of the truck.

12. A method comprising:
attaching a deployable solar panel system onto a surface of a gap space behind a driver cabin of a truck, wherein the deployable solar panel system further comprises:
a lift device positioned beneath a guide bracket, wherein the guide bracket comprises a vertical surface connected to a horizontal surface;
electrical equipment comprising an inverter or a transformer;
one or more winches;

one or more tension ropes connected to the one or more winches, wherein the one or more tension ropes are rotatably connected to the one or more winches, wherein at least one of the one or more tension ropes comprises an electrical wire that can conduct electric energy contained in a set of solar panel modules through the electrical equipment;

a guide bracket comprising a vertical surface connected to a horizontal surface in a perpendicular manner, the set of solar panel modules attached to the guide bracket via the one or more tension ropes and the electrical wire, wherein the set of solar panel modules is configured to be in either a stowed, retracted position or an expanded position in order to extend over an upper surface of a shipping container on the truck, wherein the set of solar panel modules is configured to fully retract together and once fully retracted, the set of solar panel modules is configured to be in the stowed, retracted position within an interior space of the guide bracket, and further wherein the one or more tension ropes are connected to the set of solar panel modules;

a set of rollers;

wherein the lift device is configured to raise the guide bracket to an elevated position, wherein the set of solar panel modules is configured to expand and retract as a connected set, wherein each solar panel module of the set of solar panel modules is attached on multiple sides of the each solar panel module to the one or more tension ropes and/or the electrical wire;

activating the lift device so as to raise the guide bracket which houses or contains the set of solar panel modules, wherein the guide bracket is raised above or made level with the upper surface of the shipping container;

activating the one or more winches in order to cause a first tension rope and a second tension rope of the one or more tension ropes to begin expanding the set of solar panel modules in order to expand the set of solar panel modules all along the upper surface of the shipping container, wherein the set of solar panel modules expands in a connected manner along the upper surface of the shipping container;

lowering the lift device which causes the guide bracket to lower while the set of solar panel modules remains expanded along the upper surface of the shipping container;

upon needing to retract the set of solar panel modules, raising the lift device again above or at the same level as the upper surface of the shipping container;

activating a first winch and a second winch of the one or more winches in order to rotatably retract the set of solar panel modules and cause the set of solar panel modules to return to a retracted position as held within the guide bracket; and lowering the guide bracket via the lift device in order to store the set of solar panel modules in the stowed, retracted position behind the driver cabin of the truck.

13. The method of claim 12, further comprising, causing rollers connected to the each solar panel module at a corner of the each solar panel module or in a central position along an interior side of the each solar panel module to roll along the upper surface of the shipping container.

14. The method of claim 12, wherein a centrally placed roller of the one or more rollers is installed at a center of a side that joins the each solar panel module to another solar panel module of the set of solar panel modules.

15. The method of claim 12, wherein a last solar panel module of the set of solar panel modules unfolded from the guide bracket is equipped with a fixing means to fix the last solar panel module in place on the upper surface of the shipping container of the truck.

* * * * *